United States Patent [19]

Song

[11] Patent Number: 4,646,531

[45] Date of Patent: Mar. 3, 1987

[54] REFRIGERATOR TEMPERATURE CONTROL APPARATUS

[75] Inventor: Seob S. Song, Incheon, Rep. of Korea

[73] Assignee: Dae Woo Electronics Co., Ltd., Seoul, Rep. of Korea

[21] Appl. No.: 774,912

[22] Filed: Sep. 11, 1985

[30] Foreign Application Priority Data

Dec. 10, 1984 [KR] Rep. of Korea ............. 7809/84
Jun. 14, 1985 [KR] Rep. of Korea ............. 7129/85

[51] Int. Cl.⁴ .................... F25D 17/04; F24F 7/00
[52] U.S. Cl. ........................... 62/187; 236/49; 251/129.1; 251/65
[58] Field of Search ............ 62/187, 186; 236/1 B, 236/49; 251/65, 129.09, 129.1, 129.2; 165/16

[56] References Cited

U.S. PATENT DOCUMENTS

| | | | |
|---|---|---|---|
| 2,600,297 | 6/1952 | Janos | 62/186 X |
| 4,078,583 | 3/1978 | Raghavachari et al. | 251/129.1 X |
| 4,277,019 | 7/1981 | Sheve | 236/49 |
| 4,450,897 | 5/1984 | Iijima et al. | 165/16 |
| 4,452,391 | 6/1984 | Chow | 236/1 B X |

Primary Examiner—Harry B. Tanner
Attorney, Agent, or Firm—Kenyon & Kenyon

[57] ABSTRACT

The refrigerator temperature control apparatus includes a damper in a cooled air outlet to a storage chamber. The damper is controlled by means of electromagnets with a temperature detecting portin sensing the temperature in the storage chamber and emitting a high level signal or low level signal in response to a sensed temperature. Two switching portions are connected with the temperature detecting portion so as to energize one or the other of the electro magnets for controlling the movement of the damper.

4 Claims, 8 Drawing Figures

REFRIGERATOR TEMPERATURE CONTROL APPARATUS

BACKGROUND OF INVENTION

This invention relates to a damper for opening and closing a cooled air outlet, and particularly to a refrigerator temperature control apparatus for instantly operating the damper by utilizing electro-magnets.

Generally, a damper thermo installed in a conventional refrigerator detects changes in the condition of a which is, sealed in temperature sensing device by means of the shrinking and swelling of a bellows, and the operates a cooled air inflowing control plate by means of a link, thereby controling the amount of cooled air which flows into a cooled storage chamber by opening and closing of a cooled air outlet.

Therefore, as shown in FIG. 1, when the temperature of the cooled storage chamber rises and cooled air flows into the cooled storage chamber, the gas temperature within the temperature sensing device 1 is raised by the expanding gas therein. Then the volume about the bellows 2 is increased thereby raising the link 3 connected to the bellows 2 and pushing downward the cooled air inflowing control plate 4 in the damper structure. Thus the cooled air inflowing control plate 4 is rotated around the rotation shaft 7 to automatically circulate cooled air within the cooled storage chamber.

On the other hand, should the temperature of the cooled storage chamber fall below the required temperature to store fresh food, the gas pressure in the temperature sensing device 1 decreases. At this time the spring 5 returns to its original position and pulls the link 3, whereby the control plate 4 is closed so as not to circulate the cooled air into the cooled storage chamber. A dial 6 is assembled to adjust the elastic force of the spring 5 connected to the control plate 4 and determines the inflow of cooled air.

However, such a mechanical type temperature control device has a slow responsive velocity relative to the pressure produced by the expansion and contraction of the gas, and furthermore the damper thermo should be provided with a heater for the prevention of error operation of the thermo body so that the temperature of the thermo thermal sensing device is maintained below a predetermined temperature.

Therefore in controlling the temperature of the cooled storage chamber, the operating time of the damper is delayed by the time required for the gas to expand the bellows and due to the necessity of a heater in the temperature sensing device of the refrigerator, a great amount of electric power is consumed by a prolonged use of the refrigerator even though the heater has a small energy consumption rate.

Also, U.S. Pat. No. 3,733,841 and No. 3,759,051 show a refrigerator temperature control. In these patents, the refrigerator includes a fan and fan motor mounted within the freezer chamber for circulating air from the chamber, and a thermostat installed in the cooled storage chamber for sensing the temperature, wherein according to the detected temperature the fan motor is directly operated or a semi conductor switch is triggered thereby activating the fan motor which forces cooled air to the cooled air chamber. Particularly, the damper structure disclosed in U.S. Pat. No. 3,733,841 is provided with two dampers; the first damper regulates the flow of air through the nozzle and thereby adjusts the relative portions of the cooled air from the evaporator, and the second damper is constructed to allow the inflow of the cooled air from the freezer chamber to the cooled storage chamber to be manually adjusted by opening the cooled air outlet.

SUMMARY OF THE INVENTION

Thus this invention is constructed so that the temperature of the cooled air chamber is automatically controlled dependent upon the air temperature therein without requiring a heater for preventing the error operation of the bellows which is mounted in the mechanical type temperature controller. And, different from the above patents this invention employs an improved damper structure using permanent magnets.

This invention has a configuration in which the temperature sensing portion senses the temperature of the cooled storage chamber and produces a positive or negative detecting signal which is applied to a pair of the switching portions. At this time one of switching portions is triggered to only apply the source voltage to the corresponding magnet coil and to energize the electro magnet, whereby the damper is operated to open and close the cooled air outlet to control the gas passing from the freezer chamber to the cooled storage chamber.

Thus the object of this invention is to provide an automatic refrigerator temperature control apparatus which controls the damper of the cooled air outlet by means of an electrical circuit.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
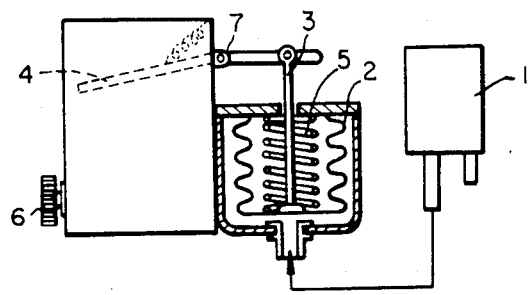
FIG. 1 is a view showing the conventional mechanical type temperature controller which uses the bellows.
Figure 2:
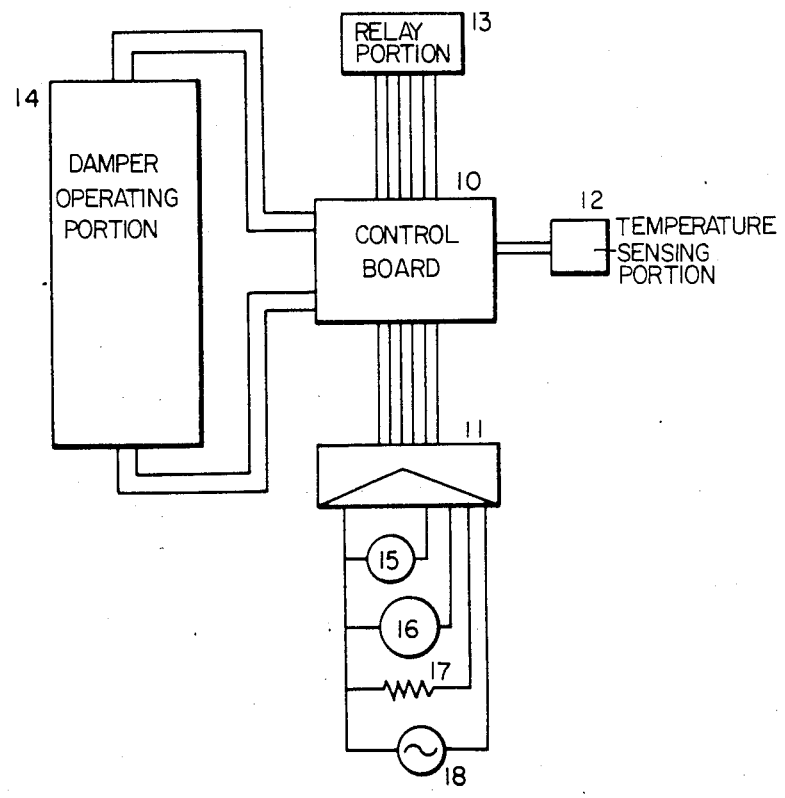
FIG. 2 is a schematic block diagram of this invention.

As shown in FIG. 2, the refrigerator includes the control board 10, the interface 11 connected to the operating components of the refrigerator, the temperature sensing portion 12, the relay portion 13, and the damper operating portion 14. The control board 10 includes the operating control circuit of the refrigerator, and the temperature detecting portion and a pair of switching portions (explained below in detail) according to the principle of this invention. The interface 11 is directly connected to the fan motor 15, the compressor 16, the heater 17 and the power supply source 18 and is interfaced with the control board 10 to control these components. The temperature sensing portion 12, the relay portion 13, and the damper operating portion 14 are connected to both the temperature detecting portion and the switching portion arranged in the control board 10 in order to control the temperature of the cooled storage chamber according to the principle of this invention.

Figure 3:
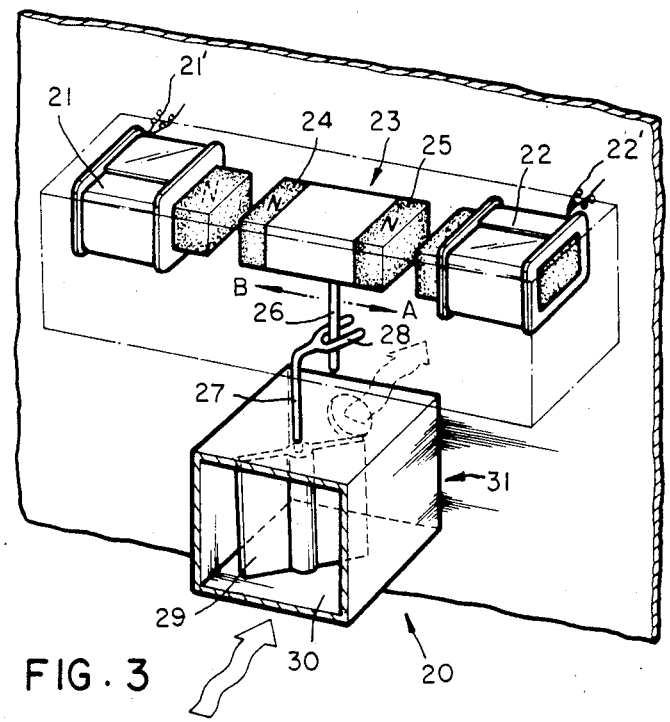
FIG. 3 is a view showing the damper structure of the temperature control apparatus in accordance with a first embodiment of this invention.

Therefore, according to the first embodiment of this invention the damper structure 20 of the damper operating portion 14 is arranged in the predetermined position as shown in FIG. 3. In the upper portion there are provided two electro magnets 21, 22 between which carrier 23 reciprocates. To both ends of the carrier the permanent magnets 24 and 25 are fixed respectively. Also, the carrier 23 is provided with the carrier shaft 26 fixed to a bottom surface to reciprocate between the electro magents 21 and 22. In the cooled air outlet 30 of the lower portion of the damper structure 20 there is provided a damper 29. The damper 29 includes a rotation shaft 27 inserted into a center portion, one end of which is fixed to the lower portion of the damper structure 20. The rotation shaft 27 includes a U-shaped guide ring 28, the other end of which is bent in a right angle.

Figure 4:
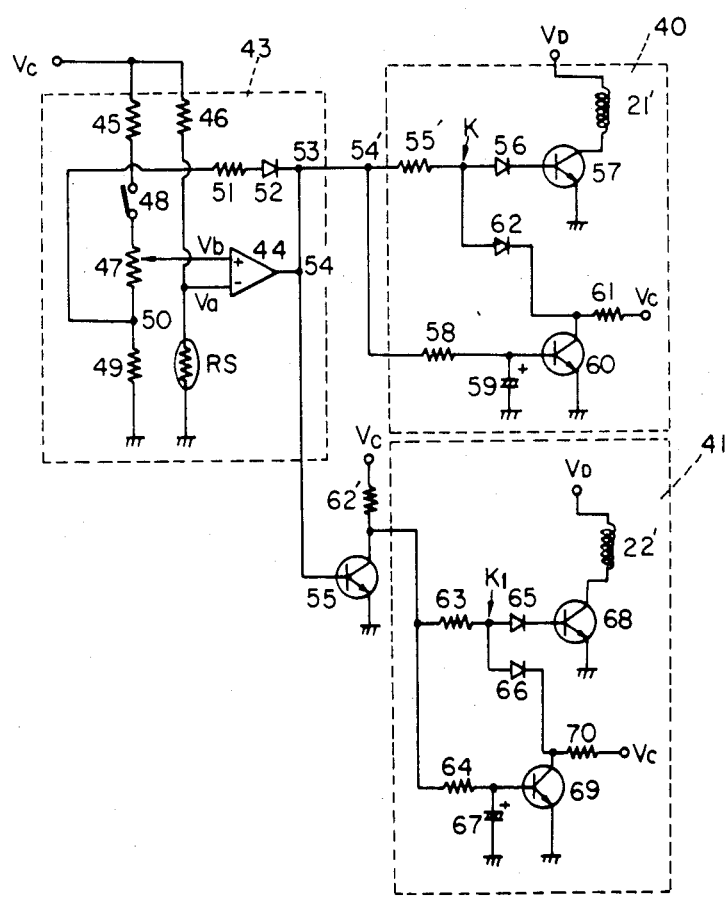
FIG. 4 is a schematic drawing showing the damper control circuit according to the first embodiment of this invention.

The guide ring 28 is coupled with the carrier shaft 26, which is inserted into a ring groove. The electro magnet coils 21' and 22' are respectively connected to a pair of switching portions 40 and 41 (FIG. 4) for actuating the damper 29. The operation of the damper 29 is performed by the temperature control circuit shown in FIG. 4.

Now the operation of the temperature control circuit will be explained. The temperature detecting portion 43 includes the temperature sensing portion 12 referred to as a thermistor RS in which its resistor value increases with a rise in temperature of the cooled storage chamber and conversely its resistor value decreases with a fall in temperature of the cooled storage chamber. Thus, the voltages $V_a$ and $V_b$ which are applied respectively to the non-inverting terminal (+) and the inverting terminal (−) of the comparator 44 are determined by the values of the resistor 46 connected between the inverting terminal of the comparator 44 and the power source $V_c$ the resistor 45 connected between the variable resistor 47 and the power source $V_c$, and the thermistor RS.

For example, $$V_a = \frac{\text{value of thermistor } RS}{\text{value of resistor 46 + value of thermistor } RS}$$

$$V_b = \frac{\text{value of variable resistor 47}}{\text{value of resistor 45 + value of variable resistor 47}}$$

Wherein the voltage $V_b$ always set as a constant voltage by predetermining the value of the variable resistor 47.

The switch 48 is used for manual or automatic control of the temperature of the cooled storage chamber. The resistor 49 is connected between the variable resistor 48 and the ground. The connection point 50 between the variable resistor 48 and resistor 49 is connected through the resistor 51, the diode 52, and the connection point 53 to a pair of switching portions 40 and 41. The output terminal of the comparator 44 is connected through the connection point 53 to the connection point 54' thereby applying the output of the comparator 44 through the connection point 53 to the base the transistor 57 of the switching portion 41 or directly to the base of the transistor 55.

Therefore when the temperature of the cooled storage chamber is lowered below a reference temperature, for example if the voltage $V_a$ is greater than the voltage $V_b$, the comparator 44 produces a high level signal and applies it through the resistor 55' and the diode 56 to the base of the transistor 57. Therefore, the transistor 57 is triggered into conduction thereby directing the power source voltage $V_d$ to the electro magnet coil 21'. At this time, the coil 21' is energized to make the electro magnet 22 produce a magnetic force of N polarity.

Thus, the permanent magnet 24 of N polarity mounted in the right portion of the carrier 23 is repelled against the N polarity magnetic force of the electro magnet 22 thereby causing the carrier 23 to move in the right direction a as shown in the drawing. Concurrently, the shaft 26 of the carrier 23 rotates the guide ring 28 of the rotation shaft 27 in a clockwise direction, thereby forcing the damper 29 mounted to the rotation shaft 27 to interrupt the cooled air from the cooled air outlet 30.

Thereafter, the high level signal applied to the delay circuit, comprising the resistor 58 and the capacitor 59, activates the transistor 60 after a predetermined time delay, for example 2–3 seconds, and then the collector of the transistor 60 applies current through the resistor 61 to the power source voltage $V_c$. Therefore, the voltage at the connection point K between the resistor 55 and the diode 55' drops below zero. The diode 62 is connected between the connection point K and the collector of the transistor 60 to interrupt the power source voltage $V_c$ applied to the resistor 61. Resultantly, the permanent magnet 25 of the carrier 23 is maintained in a coupled position with the electro magnet 22 and the damper is maintained in a closed position.

Also, the high level signal of the comparator 44 is applied to the base of the transistor 55, triggering the transistor 55 into conduction and directing the power source voltage $V_c$ through the resistor 62 to the ground. Thereafter, the switching portion 41 is not operated.

Conversely, when the temperature of the cooled storage chamber rises above the reference temperature and the voltage $V_a$ is smaller than the voltage $V_b$, comparator 44 produces a low level signal. At this time the transistor 57 of the switching portion 40 is not driven and the magnet coil 21' is not energized. Also, the power source voltage $V_c$ applied to the resistor 61 is interrupted due to the non-activation of the transistor 60. On the other hand, because the low level signal cannot drive the transistor 55, the power source voltage $V_c$ applied to the resistor 62' is applied through the resistor 63 and the diode 65 to the base of the transistor 68 to drive the transistor 68, thereby energizing the magnetic coil 22' connected to the collector of the transistor 68. Therefore, the electro magnet 22 produces a magnetic force of N polarity which is repelled against the permanent magnet 25 of the carrier 23, thereby causing the carrier 23 to move toward the left direction B as shown in the drawing. Then the shaft 26 of the carrier 23 makes the guide ring 28 of the rotation shaft 27 rotating a counter clock wise direction, whereby the damper 29 makes the cooled air outlet 30 open.

On the other hand, the power source voltage $V_c$ applied to the resistor 64 drives the transistor 69 by the delay circuit comprising the resistor 64 and the capacitor 67 after a predetermined delay time, for example two or three seconds, thereby grounding the power source applied to the resistor 70. At this time, the connection point $K_1$ between the resistor 63 and the diode 65 has zero voltage. The diode 66 is connected between the connection point $K_1$ and the collector of the transistor 69 to interrupt the power source voltage $V_c$.

Compared to the first embodiment of the second invention, this embodiment is similar in its use of the electro magnet but the extent to which the damper opens is greater than that of the first embodiment and this embodiment is simplier in construction. Also, this embodiment uses a relay in the switching portions.

Figure 5A:
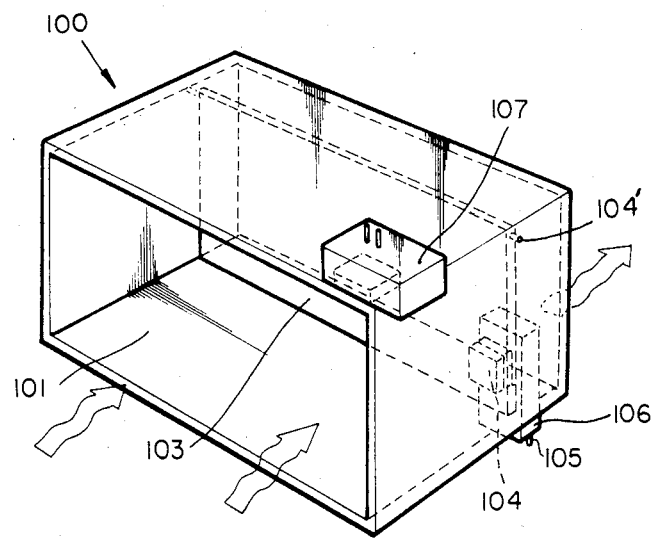
FIG. 5A is a view showing the damper structure of the temperature control apparatus in accordance with a second embodiment of this invention.
Figure 5B:
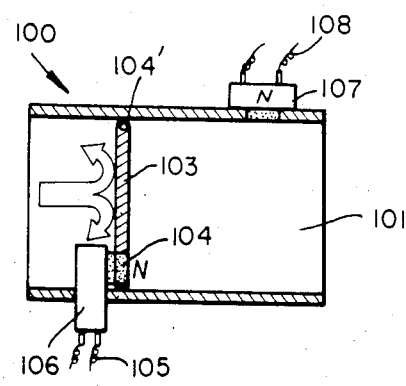
FIG. 5B and FIG. 5C are views showing the operation of the damper according to the second embodiment.
Figure 5C:
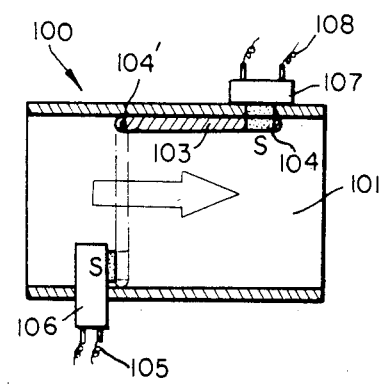
Figure 6:
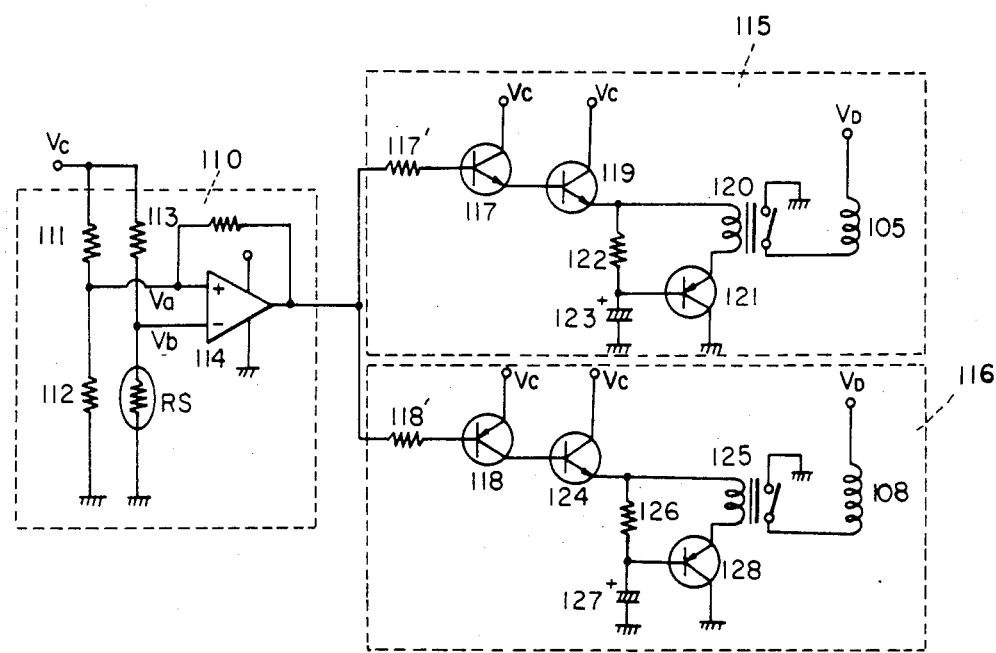
FIG. 6 is a schematic drawing showing the damper control circuit of the second embodiment.

As shown in FIGS. 5A, 5B, 5C, the damper structure 100 of the second embodiment is constructed in the passage of the cooled air outlet 101. The damper 103 is fixed by means of the hinge 104' adjacent to the cooled air inflowing portion of the cooled air outlet 101 and also includes the permanent magnet 104 positioned in the lower portion of the damper 103 so that the electro magnet 106 provided with the coil 105 is positioned to meet with the permanent magnet 104. Also, the electro magnet 107 provided with the coil 108 is positioned and fixed to the upper wall of the cooled air outlet 101 to meet with the permanent magnet 104.

As to this, the damper structure 100 can be adapted to the temperature control circuit for actuating the damper as shown in FIG. 3. In reference to the damper 103 of the damper structure 100, an explanation of the operation of the temperature control circuit of FIG. 5 is given below. The temperature detecting portion 110 is similar to the temperature detecting portion 63 of the first embodiment. This temperature detecting portion 110 is provided with the resistors 111, 112 and 113, and the temperature sensing element referred to as the thermistor RS which determines the non-inverting terminal voltage $V_a$ and the inverting terminal voltage $V_b$ of the comparator 114.

For example, the voltages $V_a$ and $V_b$ are satisfied with the following expressions.

$$V_a = \frac{\text{value of resistor 112}}{\text{value of resistor 111 + value of resistor 112}}$$

$$V_b = \frac{\text{value of variable resistor RS}}{\text{value of resistor 111 + value of variable resistor RS}}$$

Therefore when the temperature of the cooled storage chamber is raised and the voltage $V_a$ becomes greater than the voltage $V_b$, the comparator 114 produces a high level signal and instantly applies it through the resistors 117' and 118' to the bases of NPN transistor 117 and PNP transistor 118. At this time, the NPN transistor 117 is driven causing the power source voltage $V_c$ at its collector to be directed to the base of NPN transistor 119, thereby driving the NPN transistor 119. Then, the NPN transistor 119 applies the power source voltage $V_c$ from its collector to activate the relay 120. But, the PNP transistor 121 is driven after a predetermined time delay of the delay circuit comprising the resistor 122 and the capacitor 123. Thus, the magnet coil 105 is energized to make the electro magnet 105 produce a magnetic force of S polarity and to be repelled against the permanent magnet 104 of the damper 103.

Resultantly, the damper 103 is rotated toward the electro magnet 107 as shown in FIG. 5C and attached magnetically to the upper wall of the cooled air outlet 101, thereby circulating the cooled air into the cooled storage chamber. After a predetermined delay time of 2 to 3 seconds the discharge current of the capacitor 123 is applied to the base of the PNP transistor 121, thereby turning off the PNP transistor 121. Thereafter, the damper 103 is maintained in conjunction with the electro magnet 107 to open the cooled air outlet 102. While the PNP transistor 118 of the switching portion 116 for receiving the high level signal of the comparator 114 is maintained in an off condition. Therefore, the switching portion is deactivated.

On the contrary, when the temperature of the cooled storage chamber is lowered below the reference temperature, the resistance value of the thermistor RS is increased so that the voltage $V_a$ is smaller than the voltage $V_b$. At this time, the comparator 114 produces a low level signal and applies it to the base of the NPN transistor 117 in the switching portion 115 and to the PNP transistor 118 in the switching portion 116, wherein the switching portion 115 is not operated due to the interruption of the NPN transistor 117. On the other hand, the PNP transistor 118 is triggered into conduction by the low level signal and applies the power source $V_c$ from its collector to the base of the NPN transistor 124, thereby driving the NPN transistor 124. Then, this transistor 124 applies the power source voltage $V_c$ to the relay 125 and also through the resistor 126 to the base of the PNP transistor 128. But, due to the time delay of 2 to 3 seconds caused by the charging time of capacitor 127 in the delay circuit comprising the resistor 126 and the capacitor 127, the PNP transistor 128 is triggered into conduction and allows the power source voltage $V_c$ be applied to the magnetic coil 108 by turning on the relay 125. Therefore, the electro amgnet 107 produces a magnetic force of S polarity and is repelled against the permanent 104 of the damper 103, whereby the damper 104 is rotated around the hinge 104' at its center toward the upper wall of the cooled air outlet 101 to make the permenent magnet 104 couple with the electro magnet 106. Resultantly, the damper 103 closes the cooled air outlet 101 to prevent the inflow of cooled air into the cooled storage chamber.

As to this, this invention senses the temperature of the cooled storage chamber and automatically actuates the electro magnets so that the amount of cooled air circulated into the cooled storage chamber is automatically controlled by means of the temperature control circuit.

What is claimed is:

1. In a refrigerator having a storage chamber, a cooled air outlet connected to said chamber; and a damper in said outlet for controlling a flow of cooled air into said storage chamber, the combination comprising
   a shaft connected to said damper for rotating said damper within said outlet;
   a guide ring secured to said shaft;
   a movable carrier having a depending carrier shaft engaged with said ring for rotating said damper in response to movement of said carrier;
   a pair of permanent magnets mounted on opposite ends of said carrier;
   a pair of electro magnets, each electro magnet being disposed in spaced relation and opposite to a respective permanent magnet and having a magnetic coil, each said electro magnet being disposed to repel a facing permanent magnet therefrom upon energization of said coil thereof to move said carrier;
   a temperature detecting portion for sensing the temperature in said storage chamber and emitting a high level signal in response to a sensed temperature below a reference temperature and a low level signal in response to a sensed temperature above said reference temperature;

a first switching portion connected between said temperature detecting portion and said coil of one of said electro magnets for energizing said coil in response to said high level signal to move said damper to a closed position in said air outlet; and a second switching portion connected between said temperature detecting portion and said coil of the other of said electro magnets for energizing said coil in response to said low level signal to move said damper to an open position in said air outlet.

2. The combination as set forth in claim 1 which further comprises a transistor between said temperature detecting portion and one of said switching portions to block activation of said one switching portion in response to a signal from said detecting portion to activate the other switching portion.

3. The combination as set forth in claim 1 wherein each switching portion includes a first transistor for allowing a power source voltage to be applied to a respective electro magnet coil and a second transistor for allowing the power source voltage to be applied to the ground.

4. In a refrigerator having a storage chamber, a cooled air outlet connected to said chamber, and a damper in said outlet for controlling a flow of cooled air into said storage chamber, the combination comprising a hinge mounting said damper within said outlet;

a permanent magnet mounted on a lower end of said damper;

a pair of electro magnets, each electro magnet having a magnetic coil and being fixed to one of a respective lower wall of said outlet and an upper wall of said outlet;

a temperature detecting portion for sensing the temperature in said storage chamber and emitting a high level signal in response to a sensed temperature below a reference temperature and a low level signal in response to a sensed temperature above said reference temperature;

a first switching portion connected between said temperature detecting portion and said coil of one of said electro magnets for energizing said coil in response to said high level signal, said switching portion including a pair of NPN transistors to allow a power source voltage to be applied to said relay for energizing said coil of said one electro magnet to repel said permanent magnet therefrom in response to said high level signal to open said outlet; and a second switching portion connected between said temperature detecting portion and said coil of the other of said electro magnets for energizing said coil in response to said low level signal, said second switching portion including a PNP transistor, a NPN transistor and a second relay wherein said PNP and NPN transistors allow a power source voltage to be applied to said second relay for energizing said coil of said other electro magnet to repel said permanent magnet therefrom in response to said low level signal to close said outlet.

* * * * *

UNITED STATES PATENT AND TRADEMARK OFFICE
CERTIFICATE OF CORRECTION

PATENT NO. : 4,646,531

DATED : March 3, 1987

INVENTOR(S) : SEOB S. SONG

It is certified that error appears in the above-identified patent and that said Letters Patent is hereby corrected as shown below:

```
In the Abstract, line 4, "portin" should read -- portion --.
Column 1, line 11 "a which" should be -a gas which-
Column 1, line 12 "is, sealed" should be -is sealed-
Column 1, line 13 "bellows," should be "bellows"
Column 1, line 13 "and the" should be -and then-
Column 1, line 62 "semi conductor" should be -semiconductor-
Column 3, line 11 "carrier" should be -carrier 23-
Column 3, line 40 "Vc the" should be -Vc, the-
Column 3, line 51 "Vb always" should be -Vb is always-
Column 4, line 59 "rotating a" should be -rotate in a -
Column 5, line 3 "the second" should be -this-
Column 5, line 4 "this" should be -the second-
Column 6, line 27 "Vc be" should be - Vc to be-
Column 6, line 28 "amgnet" should be -magnet-
Column 6, line 30 "permanent" should be -permanent magnet-
```

Signed and Sealed this

Fifteenth Day of September, 1987

*Attest:*

DONALD J. QUIGG

*Attesting Officer*      *Commissioner of Patents and Trademarks*